United States Patent
Shiraishi

(10) Patent No.: US 12,466,408 B2
(45) Date of Patent: Nov. 11, 2025

(54) DRIVING ASSISTANCE DEVICE, DRIVING ASSISTANCE METHOD, AND PROGRAM

(71) Applicant: TOYOTA JIDOSHA KABUSHIKI KAISHA, Toyota (JP)

(72) Inventor: Daisuke Shiraishi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/169,602

(22) Filed: Feb. 15, 2023

(65) Prior Publication Data

US 2023/0303072 A1    Sep. 28, 2023

(30) Foreign Application Priority Data

Mar. 24, 2022 (JP) ................. 2022-047780

(51) Int. Cl.
*B60W 30/165* (2020.01)
*B60W 30/18* (2012.01)
*B60W 50/08* (2020.01)

(52) U.S. Cl.
CPC .... *B60W 30/165* (2013.01); *B60W 30/18118* (2013.01); *B60W 50/08* (2013.01); *B60W 2540/12* (2013.01)

(58) Field of Classification Search
None
See application file for complete search history.

(56) References Cited

U.S. PATENT DOCUMENTS

| | | | |
|---|---|---|---|
| 6,330,508 B1 | 12/2001 | Akabori et al. | |
| 8,204,660 B2* | 6/2012 | Nakai | B60W 30/18027 701/65 |
| 8,355,851 B2 | 1/2013 | Inoue et al. | |
| 8,370,040 B2 | 2/2013 | Inoue et al. | |
| 8,417,430 B2 | 4/2013 | Saeki | |
| 8,504,274 B2* | 8/2013 | Park | B60W 30/18054 701/1 |
| 8,548,709 B2 | 10/2013 | Morita | |
| 8,768,597 B2 | 7/2014 | Kagawa | |
| 9,174,643 B2 | 11/2015 | Aso | |

(Continued)

FOREIGN PATENT DOCUMENTS

| | | |
|---|---|---|
| JP | 9-109724 A | 4/1997 |
| JP | 2001-010371 A | 1/2001 |

(Continued)

*Primary Examiner* — Todd Melton
(74) *Attorney, Agent, or Firm* — Sughrue Mion, PLLC

(57) ABSTRACT

To increase convenience of an operation performed from a vehicle stop state until ACC is started or resumed, provided is a driving assistance device for a vehicle, including: a control unit (11) configured to execute travel control of at least one of constant-speed travel control or follow-up travel control, and to stop the travel control during stop of the own vehicle (100); a detection unit (43, 13) configured to detect release of a brake pedal by an occupant of the own vehicle (100); and a reception unit (60, 13) configured to receive an assistance request from the occupant. The control unit (11) is configured to execute one of start or resumption of the travel control when the detection unit (43, 13) detects the release of the brake pedal and the reception unit (60, 13) receives the assistance request during the stop of the own vehicle (100).

10 Claims, 6 Drawing Sheets

(56) References Cited

U.S. PATENT DOCUMENTS

| | | | |
|---|---|---|---|
| 9,630,623 B2 * | 4/2017 | Fairgrieve | F16H 61/0213 |
| 10,017,178 B2 | 7/2018 | Morimoto et al. | |
| 10,118,602 B2 * | 11/2018 | Fischer | F02N 11/0822 |
| 10,118,617 B2 | 11/2018 | Urano et al. | |
| 10,239,526 B2 * | 3/2019 | Durgin | B60W 30/18154 |
| 10,486,698 B2 | 11/2019 | Masui et al. | |
| 10,745,012 B2 * | 8/2020 | Bergin | B60W 10/06 |
| 12,017,651 B2 * | 6/2024 | Sabbatini | B60T 7/122 |
| 2010/0286887 A1 | 11/2010 | Maruyama | |
| 2019/0295419 A1 | 9/2019 | Tosa et al. | |

FOREIGN PATENT DOCUMENTS

| | | |
|---|---|---|
| JP | 2002-104016 A | 4/2002 |
| JP | 2011-240927 A | 12/2011 |

* cited by examiner

DRIVING ASSISTANCE DEVICE, DRIVING ASSISTANCE METHOD, AND PROGRAM

BACKGROUND OF THE INVENTION

1. Field of the Invention

The present disclosure relates to a driving assistance device, a driving assistance method, and a program, and more particularly, to a technology of adaptive cruise control (ACC).

2. Description of the Related Art

Hitherto, there has been known a driving assistance device capable of executing the ACC (see, for example, Japanese Patent Application Laid-open No. 2001-010371). The ACC is control of executing constant-speed travel control of causing, when a preceding vehicle does not exist in front of an own vehicle, the own vehicle to travel at a constant speed being a target vehicle speed and follow-up travel control of causing, when a preceding vehicle exists, the own vehicle to travel to follow the preceding vehicle at a vehicle speed equal to or lower than the target vehicle speed.

An EPB-installed vehicle in which an electric stop holding mechanism such as an electric parking brake (EPB) is installed can hold the vehicle in a stop state by activating the EPB during the stop of the vehicle. Thus, in the EPB-installed vehicle, the ACC can be enabled also during the stop of the vehicle. Thus, when the driver depresses an accelerator pedal at the time of the start of the vehicle, the driver can start or resume the ACC early.

Meanwhile, in an EPB-non-installed vehicle in which the EPB is not installed, there is a limit on a braking force applied from a system side to wheels during the stop of the vehicle. Accordingly, when the ACC is enabled during the stop of the vehicle, there is a fear that safety cannot be secured in a case in which the driver has gotten off the vehicle, for example. Thus, in the EPB-non-installed vehicle, in general, the ACC is stopped during the stop of the vehicle, and a brake operation of maintaining the vehicle in the stop state is entrusted to the driver.

In such an EPB-non-installed vehicle, from the vehicle stop state until the ACC is started or resumed, the driver is required to set an activation switch to ON after the driver releases a brake pedal and increases the vehicle speed to a predetermined vehicle speed through an accelerator operation. As a result, the driver may be annoyed. That is, it is considered that there is room for improving convenience of the operation performed from the vehicle stop state until the ACC is started or resumed.

SUMMARY OF THE INVENTION

The present disclosure has been devised in order to solve the above-mentioned problem. That is, one object of the present disclosure is to increase convenience of an operation performed from a vehicle stop state until ACC is started or resumed.

According to at least one embodiment of the present disclosure, there is provided a driving assistance device (1) for a vehicle (100), including: a control unit (11) configured to execute, based on a situation of a periphery of an own vehicle (100), travel control of at least one of constant-speed travel control of causing the own vehicle (100) to travel at a constant speed or follow-up travel control of causing the own vehicle (100) to travel to follow a preceding vehicle (200), and to stop the travel control during stop of the own vehicle (100); a detection unit (43, 13) configured to detect release of a brake pedal by an occupant of the own vehicle (100); and a reception unit (60, 13) configured to receive an assistance request from the occupant, wherein the control unit (11) is configured to execute one of start or resumption of the travel control when the detection unit (43, 13) detects the release of the brake pedal and the reception unit (60, 13) receives the assistance request during the stop of the own vehicle (100).

According to at least one embodiment of the present disclosure, there is provided a driving assistance method for a vehicle (100), including: executing, based on a situation of a periphery of an own vehicle (100), travel control of at least one of constant-speed travel control of causing the own vehicle (100) to travel at a constant speed or follow-up travel control of causing the own vehicle (100) to travel to follow a preceding vehicle, and stopping the travel control during stop of the own vehicle (100); and executing one of start or resumption of the travel control when release of a brake pedal by an occupant of the own vehicle (100) is detected and an assistance request from the occupant is received during the stop of the own vehicle (100).

According to at least one embodiment of the present disclosure, there is provided a program for causing a computer of a driving assistance device (1) for a vehicle (100) to execute the processes of: executing, based on a situation of a periphery of an own vehicle (100), travel control of at least one of constant-speed travel control of causing the own vehicle (100) to travel at a constant speed or follow-up travel control of causing the own vehicle (100) to travel to follow a preceding vehicle, and stopping the travel control during stop of the own vehicle (100); and executing one of start or resumption of the travel control when release of a brake pedal by an occupant of the own vehicle (100) is detected and an assistance request from the occupant is received during the stop of the own vehicle (100).

With the above-mentioned configuration, when a driver is to start the stopped vehicle (100) through the travel control (ACC), the driver can early start or resume the travel control (ACC) by only releasing a brake pedal and setting an ACC switch (61, 64) to ON under the state in which the vehicle (100) is stopped. That is, it is not required to perform an accelerator operation required to start or resume the travel control (ACC) in a related-art EPB-non-installed vehicle, specifically, an operation of depressing an accelerator pedal to increase a vehicle speed (V) to a lower limit vehicle speed (Vs). As a result, it is possible to effectively prevent the driver from being annoyed, and convenience of the operation can reliably be increased. Moreover, the travel control (ACC) can early be started or resumed before the vehicle speed (V) reaches the lower limit vehicle speed (Vs), and hence drivability can also be increased.

In another aspect of the present disclosure, the driving assistance device further includes a determination unit (12) configured to determine whether the own vehicle (100) is in a start possible state in which the own vehicle (100) is allowed to start forward, based on the situation of the periphery of the own vehicle (100) during the stop of the own vehicle (100), and the control unit (11) is configured to execute one of start or resumption of the travel control when the detection unit (43, 13) detects the release of the brake pedal and the reception unit (60, 13) receives the assistance request after the determination unit (12) determines that the own vehicle is in the start possible state.

According to this aspect, the control unit (11) starts or resumes the travel control (ACC) under the state in which the vehicle (100) can reliably start forward. As a result, it is possible to prevent the started travel control (ACC) from being stopped after a short time, for example, when a preceding vehicle stops immediately after the travel control (ACC) is started, and hence it is possible to effectively prevent the driver from feeling a sense of discomfort.

In another aspect of the present disclosure, the driving assistance device further includes a braking force control unit (15) configured to execute braking force holding control of holding a braking force for maintaining the own vehicle (100) in a stop state when the own vehicle (100) has stopped on an uphill road, and the braking force control unit (15) is configured to hold the braking force even when the detection unit (43, 13) detects the release of the brake pedal during the execution of the braking force holding control, and release the braking force when the reception unit (60, 13) receives the assistance request.

According to this aspect, when the travel control (ACC) is to be started or to be resumed from the state in which the vehicle (100) is stopped on the uphill road, even when the driver releases the brake pedal, the braking force is applied to wheels through the braking force holding control until the driver sets the ACC switch (61, 64) to ON. As a result, when the vehicle (100) is to be started on the uphill road, the travel control (ACC) can smoothly be started or resumed without occurrence of a downhill movement of the vehicle (100), and hence drivability can be increased.

In order to facilitate the understanding of the invention, in the above description, the constituent features of the invention corresponding to at least one embodiment of the present disclosure are suffixed in parentheses with reference symbols used in the at least one embodiment. However, the constituent features of the invention are not intended to be limited to those in the at least one embodiment as defined by the reference symbols.

DESCRIPTION OF THE EMBODIMENTS

Description is now given of a driving assistance device, a driving assistance method, and a program according to at least one embodiment of the present disclosure with reference to the drawings. Like components are denoted by like reference symbols and the same applies to the names and functions of those components. Thus, a detailed description of those components is not repeated.
[Overall Configuration]

Figure 1:
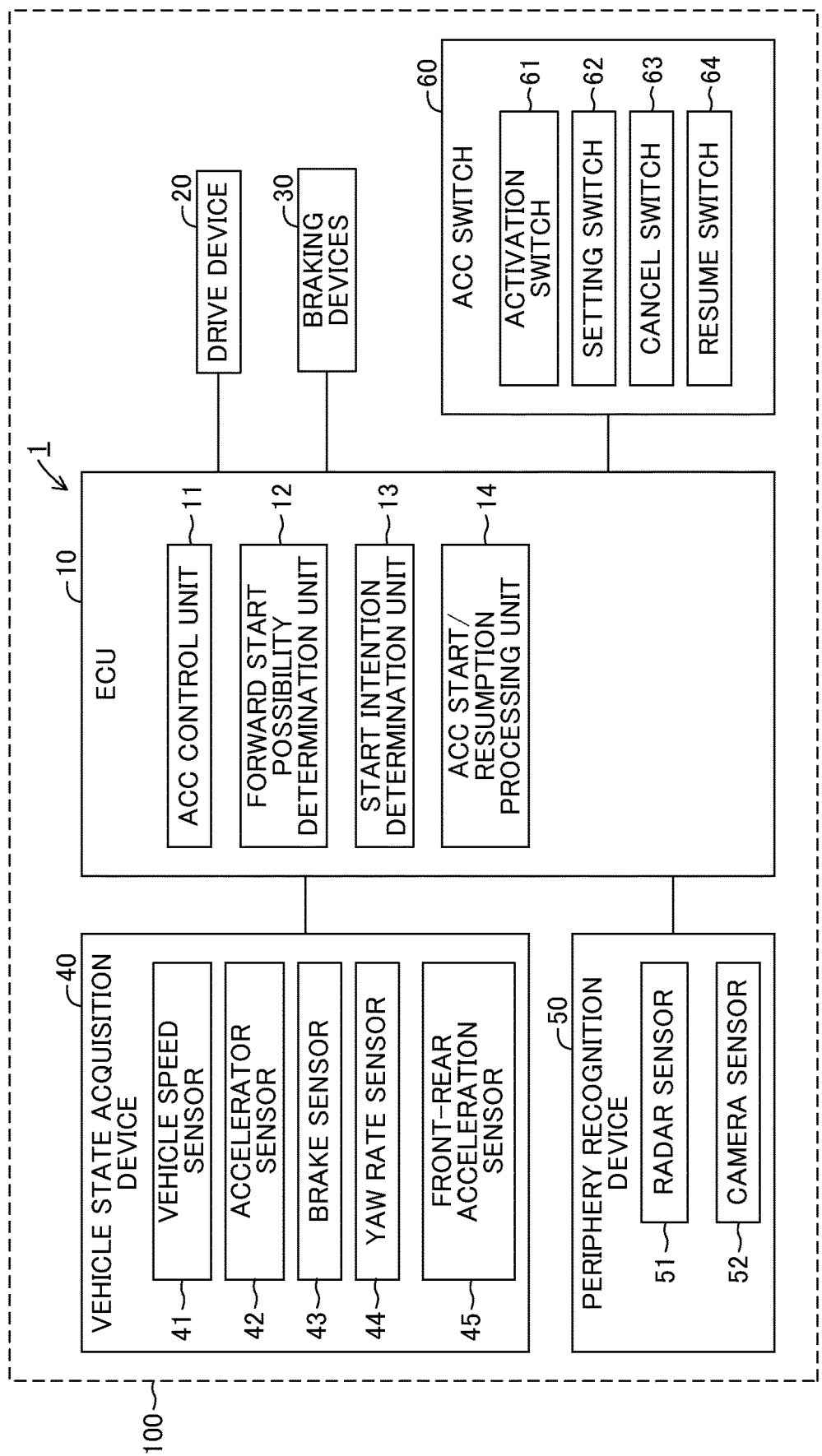
FIG. 1 is a schematic overall configuration diagram of a driving assistance device according to at least one embodiment of the present disclosure.

FIG. 1 is a schematic overall configuration diagram of a driving assistance device 1 according to the at least one embodiment. The driving assistance device 1 is mounted to a vehicle 100. The vehicle 100 to which the driving assistance device 1 is mounted is hereinafter also referred to as "own vehicle" to distinguish this vehicle 100 from other vehicles.

The driving assistance device 1 includes an ECU 10. The ECU 10 includes a microcomputer as a principal component. The term "ECU" is an abbreviation for "electronic control unit." The microcomputer includes a CPU, a ROM, a RAM, and an interface, for example, and the CPU implements various functions by executing instructions (programs, or routines) stored in the ROM.

The ECU 10 is a central control device which executes driving assistance for a driver, and executes adaptive cruise control (ACC). The driving assistance herein is a concept including automatic driving. The ACC is control of causing, when a preceding vehicle does not exist in front of the own vehicle 100, the own vehicle 100 to travel at a constant speed being a target vehicle speed and causing, when a preceding vehicle exists in front of the own vehicle 100, the own vehicle 100 to travel to follow the preceding vehicle at a vehicle speed equal to or lower than the target vehicle speed while maintaining an inter-vehicle distance between the preceding vehicle and the own vehicle 100 at a target inter-vehicle distance. The ACC is executed by the ECU 10 controlling operations of a drive device 20, braking devices 30, and the like based on a travel state of the vehicle 100 and a situation of a periphery of the vehicle 100. Thus, the drive device 20, the braking devices 30, a vehicle state acquisition device 40, a periphery recognition device 50, an ACC switch 60, and the like are connected to the ECU 10 for communication.

The drive device 20 generates a driving force to be transmitted to driving wheels of the vehicle 100. As the drive device 20, for example, an engine and an electric motor are given. In the device according to the at least one embodiment, the vehicle 100 may be any one of a hybrid vehicle (HEV), a plug-in hybrid electric vehicle (PHEV), a fuel cell electric vehicle (FCEV), a battery electric vehicle (BEV), and an engine vehicle.

The braking devices 30 are, for example, disc brake devices, and apply a braking force to the wheels of the vehicle 100. The braking devices 30 are not limited to the disc brake devices, and may be drum brake devices or the like. In the at least one embodiment, the vehicle 100 is an EPB-non-installed vehicle which does not include an electric stop holding mechanism, for example, an electric parking brake (EPB). The vehicle 100 may be an EPB-installed vehicle which includes the EPB.

The vehicle state acquisition device 40 is sensors which acquire states of the vehicle 100. Specifically, the vehicle state acquisition device 40 includes a vehicle speed sensor 41, an accelerator sensor 42, a brake sensor 43, a yaw rate sensor 44, a front-rear acceleration sensor 45, and the like.

The vehicle speed sensor 41 detects a travel speed (vehicle speed V) of the vehicle 100, and transmits the detected vehicle speed V to the ECU 10. The vehicle speed sensor 41 may be a wheel speed sensor. The accelerator sensor 42 detects an operation amount of an accelerator pedal (not shown) by the driver, and transmits the detected accelerator operation amount to the ECU 10. The brake sensor 43 detects an operation amount of a brake pedal (not shown) by the driver, and transmits the detected brake operation amount to the ECU 10. The yaw rate sensor 44 detects a yaw rate of the vehicle 100, and transmits the detected yaw rate to the ECU 10. The front-rear acceleration sensor 45 detects an acceleration G of the vehicle 100 in a front-rear direction thereof, and transmits the detected acceleration G to the ECU 10.

The periphery recognition device 50 is sensors which acquire target information on targets around the vehicle 100. Specifically, the periphery recognition device 50 includes a radar sensor 51, a camera sensor 52, and the like. As the target information, there are given, for example, a peripheral vehicle, a traffic light, a white line of a road, a traffic sign, a fallen object, and the like. The target information around the vehicle 100 acquired by the periphery recognition device 50 is transmitted to the ECU 10.

The radar sensor 51 is provided in, for example, a front portion of the vehicle 100, and detects a target existing in a region located on the front side of the vehicle 100. The radar sensor 51 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance Dr between the vehicle 100 and the target, a relative speed Vr between the vehicle 100 and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle 100, the relative distance Dr between the vehicle 100 and the target, the relative speed Vr between the vehicle 100 and the target, and the like. The relative distance Dr is a distance between the own vehicle 100 and a target (for example, a preceding vehicle) along a center axis of the own vehicle 100. The relative speed Vr is a difference (=Vb−V) between a speed Vb of the target (for example, the preceding vehicle) and the vehicle speed V of the own vehicle 100. The speed Vb of the target is a speed of the target in a traveling direction of the own vehicle 100.

The camera sensor 52 is, for example, a stereo camera or a monocular camera, and a digital camera including an image pickup element such as a CMOS sensor or a CCD sensor can be used as the camera sensor 52. The camera sensor 52 is arranged in, for example, a top portion of a front windshield glass of the vehicle 100. The camera sensor 52 captures a region in front of the vehicle 100, and processes captured image data, to thereby obtain the target information in front of the vehicle 100. The target information is information indicating a type of the target detected in front of the vehicle 100, the relative distance Dr between the vehicle 100 and the target, the relative speed Vr between the vehicle 100 and the target, and the like. It is only required to recognize the type of the target through, for example, machine learning such as pattern matching.

The periphery recognition device 50 repeatedly transmit the acquired target information to the ECU 10 each time a predetermined time elapses. The ECU 10 composes the relative relationship between the vehicle 100 and the target acquired by the radar sensor 51 and the relative relationship between the vehicle 100 and the target acquired by the camera sensor 52, to thereby determine a relative relationship between the vehicle 100 and the target. It is not always required for the periphery recognition device 50 to include both of the radar sensor 51 and the camera sensor 52, and may include, for example, only the radar sensor 51 or only the camera sensor 52.

The ACC switch 60 is a switch group provided in a neighborhood of a driver's seat (for example, a steering wheel, a steering column, or the like), and operated by the driver. The ACC switch 60 includes an activation switch 61, a setting switch 62, a cancel switch 63, a resume switch 64, and the like.

The activation switch 61 is a switch for the driver to select to activate or stop the ACC. The setting switch 62 is a switch to freely set or change a target vehicle speed Vtag and a target inter-vehicle distance Dtag (or a target inter-vehicle time) of the ACC within predetermined ranges. The target vehicle speed Vtag is a vehicle speed maintained by the vehicle 100 when constant-speed travel control described later is executed. To the target vehicle speed Vtag, a lower limit vehicle speed Vs (for example, 30 km/h) is provided as the lowest speed which can be set. The target inter-vehicle distance Dtag is an inter-vehicle distance provided between the vehicle 100 and a preceding vehicle at the vehicle speed V equal to or lower than the target vehicle speed Vtag when follow-up travel control described later is executed.

The cancel switch 63 is a switch for temporarily canceling the ACC being executed. When the driver sets the cancel switch 63 to ON during the execution of the ACC, the ACC is canceled. The resume switch 64 is a switch for resuming the ACC which has temporarily been canceled. The ACC which has temporarily been canceled by setting the cancel switch 63 to ON or through a depression operation of the brake pedal can be resumed by setting the resume switch 64 to ON before the driver stops the vehicle 100.

In the at least one embodiment, the ACC stopped as a result of the stop of the vehicle 100 can be resumed by the driver setting the activation switch 61 or the resume switch 64 to ON. Details of the resumption processing for the ACC are described later.

[ACC]

Description is now given of details of the ECU 10 in the at least one embodiment. When functions of the ECU 10 are focused on, the ECU 10 includes an ACC control unit 11, a forward start possibility determination unit 12, a start intention determination unit 13, and an ACC start/resumption processing unit 14 as a part of functional elements. Those functional elements are described as being included in the ECU 10 which is integrated hardware, but any part thereof may be provided to an ECU independent of the ECU 10. Moreover, a part of the functional elements of the ECU 10 may be provided to an external information processing device or the like which can communicate to and from the vehicle 100.

The ACC control unit 11 executes the ACC based on the target vehicle speed Vtag and the target inter-vehicle distance Dtag. The ACC itself is well known (see, for example, see Japanese Patent Application Laid-open No. 2014-148293, Japanese Patent Application Laid-open No. 2006-315491, Japanese Patent No. 4172434, and Japanese Patent No. 4929777). Thus, a brief description is now given of the ACC. The ACC includes two types of control, namely, the constant-speed travel control and the follow-up travel control.

The constant-speed travel control is control of causing the vehicle 100 to travel at a constant speed in accordance with the target vehicle speed Vtag without requiring the accelerator operation of the driver.

The ACC control unit 11 executes the constant-speed travel control when a preceding vehicle does not exist. That is, the ACC control unit 11 determines a target acceleration Gtgt based on the target vehicle speed Vtag and the vehicle speed V so that the vehicle speed V of the vehicle 100 matches the target vehicle speed Vtag. The ACC control unit 11 sets the target acceleration Gtgt to "0" when the current vehicle speed V matches the target vehicle speed Vtag. The ACC control unit 11 increases the target acceleration Gtgt when the target vehicle speed Vtag is higher than the vehicle speed V. The ACC control unit 11 reduces the target acceleration Gtgt when the target vehicle speed Vtag is lower than the vehicle speed V.

The ACC control unit 11 controls the drive of the drive device 20 and controls the activation of the braking devices 30 as required such that the acceleration of the vehicle 100 matches the target acceleration Gtgt, that is, the vehicle 100 travels in accordance with the target acceleration Gtgt.

The follow-up travel control is control of causing the vehicle 100 to travel such that the vehicle 100 follows a preceding vehicle while maintaining the inter-vehicle distance to the preceding vehicle at the target inter-vehicle distance Dtag.

The ACC control unit 11 executes the follow-up travel control when a preceding vehicle exists. In this case, the ACC control unit 11 selects a following target vehicle based on the target information acquired by the periphery recognition device 50. Further, the ACC control unit 11 calculates the target acceleration Gtgt as given by any one of Expression (1) and Expression (2).

$$Gtgt(acceleration) = ka1 \cdot (k1 \cdot \Delta D + k2 \cdot Vr) \quad (1)$$

$$Gtgt(deceleration) = kd1 \cdot (k1 \cdot \Delta D + k2 \cdot Vr) \quad (2)$$

In Expression (1) and Expression (2), Vr is the relative speed of the following target vehicle, and k1 and k2 are predetermined positive gains (coefficients). The value $\Delta D$ is an inter-vehicle deviation (=Dr−Dtag) obtained by subtracting the target inter-vehicle distance Dtag from the relative distance Dr of the following target vehicle.

The ACC control unit 11 uses Expression (1) to determine the target acceleration Gtgt when the value (k1·$\Delta D$+k2'Vr) is positive or "0." The value ka1 is a positive gain (coefficient) for the acceleration, and is set to a value equal to or less than "1." The ACC control unit 11 uses Expression (2) to determine the target acceleration Gtgt when the value (k1·$\Delta D$+k2'Vr) is negative. The value kd1 is a gain (coefficient) for the deceleration, and is set to "1" in this example. The ACC control unit 11 controls the drive of the drive device 20 and controls the activation of the braking devices 30 as required such that the acceleration of the vehicle 100 matches the target acceleration Gtgt, that is, the vehicle 100 travels in accordance with the target acceleration Gtgt.

The ACC control unit 11 temporarily cancels the ACC when any one of the following cancel conditions is satisfied.

Cancel condition (1): The driver sets the cancel switch 63 to ON during the execution of the ACC.

Cancel condition (2): The driver depresses the brake pedal during the execution of the ACC.

When the ACC is canceled, a travel mode transitions from a driving assistance mode in which the constant-speed travel control or the follow-up travel control is executed to a normal travel mode in which the driving operation of the vehicle 100 is entrusted to the driver.

When the cancel condition (1) or the cancel condition (2) is satisfied, the ACC control unit 11 temporarily cancels the ACC, and stores the target vehicle speed Vtag and the target inter-vehicle distance Dtag of the canceled ACC in the RAM of the ECU 10. After the ACC control unit 11 cancels the ACC due to the satisfaction of the cancel condition (1) or the cancel condition (2), the ACC control unit 11 resumes the ACC when the driver sets the resume switch 64 to ON before the vehicle 100 stops. In this case, the ACC is executed based on the target vehicle speed Vtag and the target inter-vehicle distance Dtag which are temporarily stored in the RAM.

The ACC control unit 11 stops, that is, disables the ACC when any one of the following stop conditions is satisfied.

Stop condition (1): The driver sets the activation switch 61 to OFF.

Stop condition (2): The own vehicle 100 has stopped due to stop of the preceding vehicle during the execution of the follow-up travel control.

Stop condition (3): The vehicle 100 has stopped without the driver setting the resume switch 64 to ON after the ACC is canceled due to the satisfaction of the cancel condition (1) or the cancel condition (2).

When the ACC control unit 11 stops the ACC due to the satisfaction of the stop condition (1), the ACC control unit 11 resets (deletes) the target vehicle speed Vtag and the target inter-vehicle distance Dtag. Moreover, when the ACC control unit 11 stops the ACC due to the satisfaction of the stop condition (2), the ACC control unit 11 switches the activation switch 61 from ON to OFF, and temporarily stores, in the RAM of the ECU 10, the target vehicle speed Vtag and the target inter-vehicle distance Dtag of the stopped ACC. Further, when the ACC control unit 11 stops the ACC due to the satisfaction of the stop condition (3), the ACC control unit 11 switches the activation switch 61 from ON to OFF, and holds the target vehicle speed Vtag and the target inter-vehicle distance Dtag which were temporarily stored in the RAM of the ECU 10 when the ACC was canceled. A stop operation of continuously stopping the vehicle 100 after the ACC is stopped is entrusted to the brake operation of the driver.

The forward start possibility determination unit 12 determines whether or not the vehicle 100 has reached a state in which the vehicle 100 can start forward while the driver is depressing the brake pedal to stop the vehicle 100. The state in which the stopped vehicle 100 can start forward is hereinafter referred to as "forward start possible state."

The forward start possibility determination unit 12 determines whether or not a preceding vehicle exists in front of the stopped own vehicle 100 based on the detection result of the periphery recognition device 50. When the preceding vehicle exists, the forward start possibility determination unit 12 determines whether or not the preceding vehicle has started. When the preceding vehicle has started forward, the forward start possibility determination unit 12 determines whether or not the following start possibility conditions are satisfied.

Start possibility condition (1): The relative distance Dr of the preceding vehicle with respect to the own vehicle 100 has increased to a predetermined threshold distance Dth (Dr≥Dth).

Start possibility condition (2): The relative speed Vr of the preceding vehicle with respect to the own vehicle 100 has increased to a predetermined threshold speed Vth (Vr≥Vth).

When any one of the start possibility condition (1) and the start possibility condition (2) is satisfied, the forward start possibility determination unit 12 determines that the own vehicle 100 is in the forward start possible state. Meanwhile, when none of the start possibility condition (1) and the start possibility condition (2) is satisfied, the forward start possibility determination unit 12 determines that the own vehicle 100 is not in the forward start possible state. To each of the threshold distance Dth and the threshold speed Vth, hysteresis may be added in order to prevent the determination result from repeatedly switching in a short period.

Meanwhile, there is also assumed a case in which a preceding vehicle does not exist in front of the stopped own vehicle 100 such as a case in which the own vehicle 100 is stopped on a red traffic light at the head of a line of vehicles. In this case, the forward start possibility determination unit 12 recognizes a light color of the traffic light based on the detection result of the periphery recognition device 50, and determines that the own vehicle 100 is in the forward start possible state when the light color of the traffic light switches from red to green. It is only required to recognize the light color of the traffic light thorough machine learning such as the pattern matching based on image data of the traffic light captured by the camera sensor 52. When a preceding vehicle does not exist, the forward start possibility determination unit 12 does not determine whether or not the forward start is possible, and this determination may be entrusted to determination of the driver through visual observation.

The start intention determination unit 13 determines whether or not the driver intends to start the vehicle 100 through the ACC when the own vehicle 100 is determined to be capable of starting forward. The intention of the driver to start the vehicle 100 through the ACC is hereinafter simply referred to as "ACC start intention."

The start intention determination unit 13 first determines whether or not the driver has executed a first start operation of releasing the brake pedal. It is only required to determine the release of the brake pedal based on the detection result of the brake sensor 43. When the driver has executed the first start operation, the start intention determination unit 13 determines whether or not the driver has executed any one of a second start operation of setting the activation switch 61 to ON and a third start operation of setting the resume switch 64 to ON. When the driver has executed any one of the second start operation and the third start operation after the execution of the first start operation, the start intention determination unit 13 determines that the driver has the ACC start intention. Meanwhile, even when the driver has executed the first start operation, but the driver has executed none of the second start operation and the third start operation, the start intention determination unit 13 determines that the driver does not have the ACC start intention.

The ACC start/resumption processing unit 14 transmits an instruction signal for starting or resuming the ACC to the ACC control unit 11 when it is determined that, during the stop of the own vehicle 100, the own vehicle 100 comes to be capable of starting forward, and the driver has the ACC start intention.

The start of the ACC refers to a case in which, after the driver sets an ignition switch or a power switch of the vehicle 100 to ON, the driver sets the activation switch 61 to ON for the first time, to thereby execute the ACC, or a case in which, after the driver sets the activation switch 61 to OFF (the above-mentioned stop condition (1)), the driver again sets the activation switch 61 to ON before the driver sets the ignition switch or the power switch to OFF, to thereby execute the ACC. Moreover, the resumption of the ACC refers to a case in which, after the system stops the ACC due to the stop of the vehicle 100 under the state in which the activation switch 61 is in the ON state, the driver sets the activation switch 61 or the resume switch 64 to ON before the ignition switch or the power switch of the vehicle 100 is set to OFF, to thereby execute again the ACC.

When the ACC control unit 11 receives the instruction signal from the ACC start/resumption processing unit 14, the ACC control unit 11 starts or resumes the ACC. When the driver executes the second start operation of setting the activation switch 61 to ON, the ACC control unit 11 sets the above-mentioned lower limit vehicle speed Vs to the target vehicle speed Vtag, to thereby start or resume the ACC. Meanwhile, when the driver executes the third start operation of setting the resume switch 64 to ON, the ACC control unit 11 resumes the ACC based on the target vehicle speed Vtag temporarily stored in the RAM of the ECU 10 when the ACC was canceled. The ON setting of the resume switch 64 is effective when the ACC is to be resumed. Even when the resume switch 64 is set to ON when the ACC is to be started, this setting is treated as ineffective.

In the at least one embodiment, as described above, when the driver starts the stopped vehicle 100 through use of the ACC, the ACC can be started or resumed early only by the operations on the two stages being (1) releasing the brake pedal and (2) setting the activation switch 61 or the resume switch 64 to ON under the state in which the vehicle 100 can start forward. That is, it is not required to perform the accelerator operation required to start or resume the ACC in a related-art EPB-non-installed vehicle, specifically, the accelerator operation for increasing the vehicle speed V to the lower limit vehicle speed Vs. As a result, it is possible to effectively prevent the driver from being annoyed, and convenience of the operation can reliably be increased. Moreover, the ACC can early be started or resumed before the vehicle speed V reaches the lower limit vehicle speed Vs, and hence drivability can also be increased.

Figure 2:
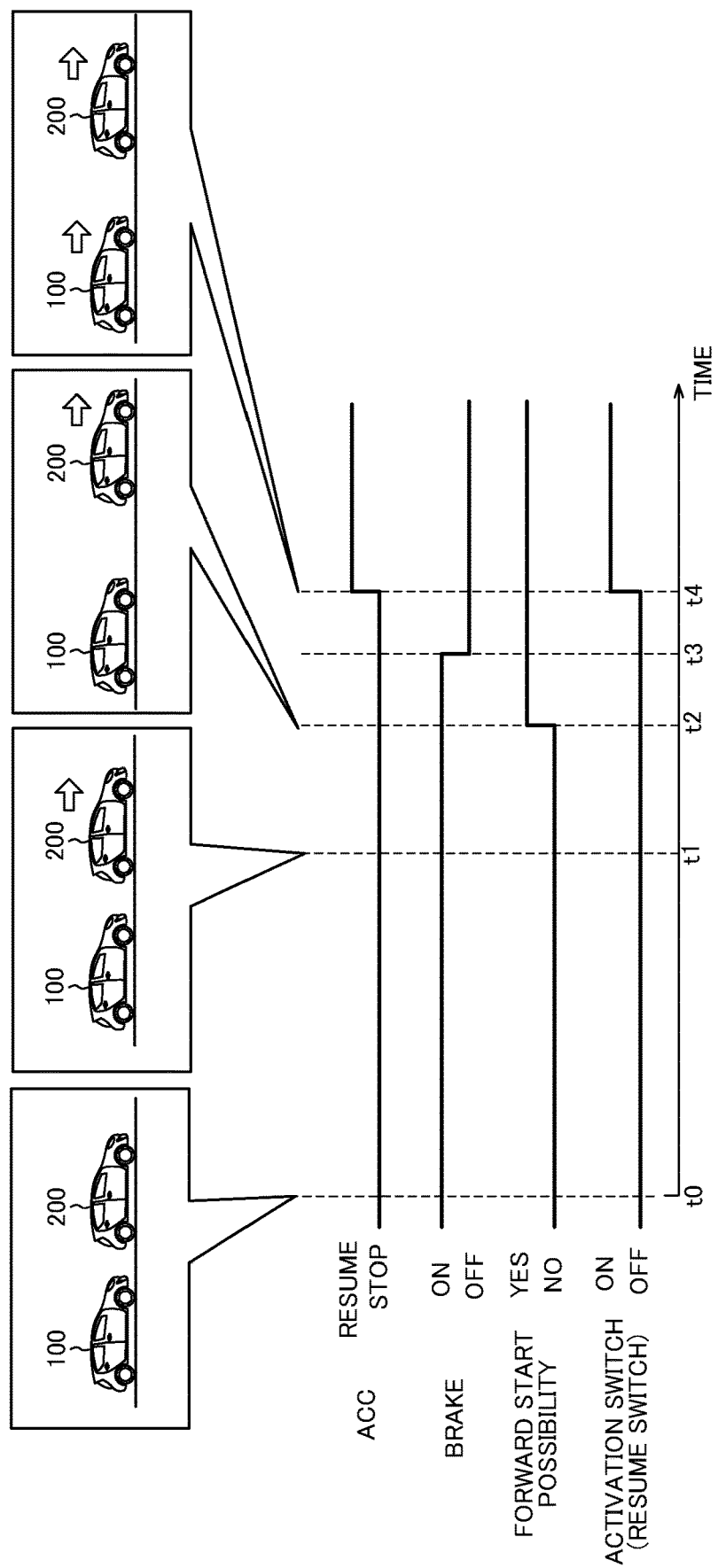
FIG. 2 is a timing chart for illustrating a flow of resumption processing for ACC in the at least one embodiment.

Referring to a timing chart of FIG. 2, description is now given of a flow of the resumption processing for the ACC in the at least one embodiment. Only processing of determining the forward start possibility state is different between the case in which a preceding vehicle 200 exists in front of the stopped own vehicle 100 and the case in which the preceding vehicle 200 does not exist, and the other processing is equivalent therebetween. Thus, the case in which the preceding vehicle 200 exists is described below. Moreover, the start processing for the ACC and the resumption processing for the ACC are different from each other only in that the ON setting of the resume switch 64 is effective or ineffective. Thus, the resumption processing for the ACC is described below.

At a time t0, there exists the state in which the ACC is stopped due to the satisfaction of the above-mentioned stop condition (2) or stop condition (3), and the driver is depressing the brake pedal, to thereby stop the vehicle 100. When the preceding vehicle 200 starts at a time t1, the ECU 10 starts the determination processing for the forward start possibility. When, at a time t2, any one of the start possibility condition (1) that the relative distance Dr of the preceding vehicle 200 with respect to the own vehicle 100 is equal to or longer than the threshold distance Dth and the start possibility condition (2) that the relative speed Vr of the preceding vehicle 200 with respect to the own vehicle 100 is equal to or higher than the threshold speed Vth is satisfied, the ECU 10 determines that the own vehicle 100 is in the forward start possible state.

When the driver releases the brake pedal at a time t3, and the driver sets the activation switch 61 (or the resume switch 64) to ON at a time t4, the ECU 10 resumes the ACC at the time t4. That is, the follow-up travel control of the ACC which causes the own vehicle 100 to travel to follow the preceding vehicle 200 without requiring the accelerator operation of the driver is resumed at the time t4.

Meanwhile, in related-art control, the ACC cannot be resumed unless the driver sets the activation switch to ON after the driver determines that the forward start is possible, hence releases the brake pedal, and depresses the accelerator pedal to increase the vehicle speed V to the lower limit vehicle speed Vs. In the at least one embodiment, the ACC can early be resumed without waiting for the accelerator operation and the increase in the vehicle speed V. Thus, it is possible to effectively reduce the annoyance of the driver compared with the related-art control, and the convenience of the operation can also reliably be increased.

Figure 3:
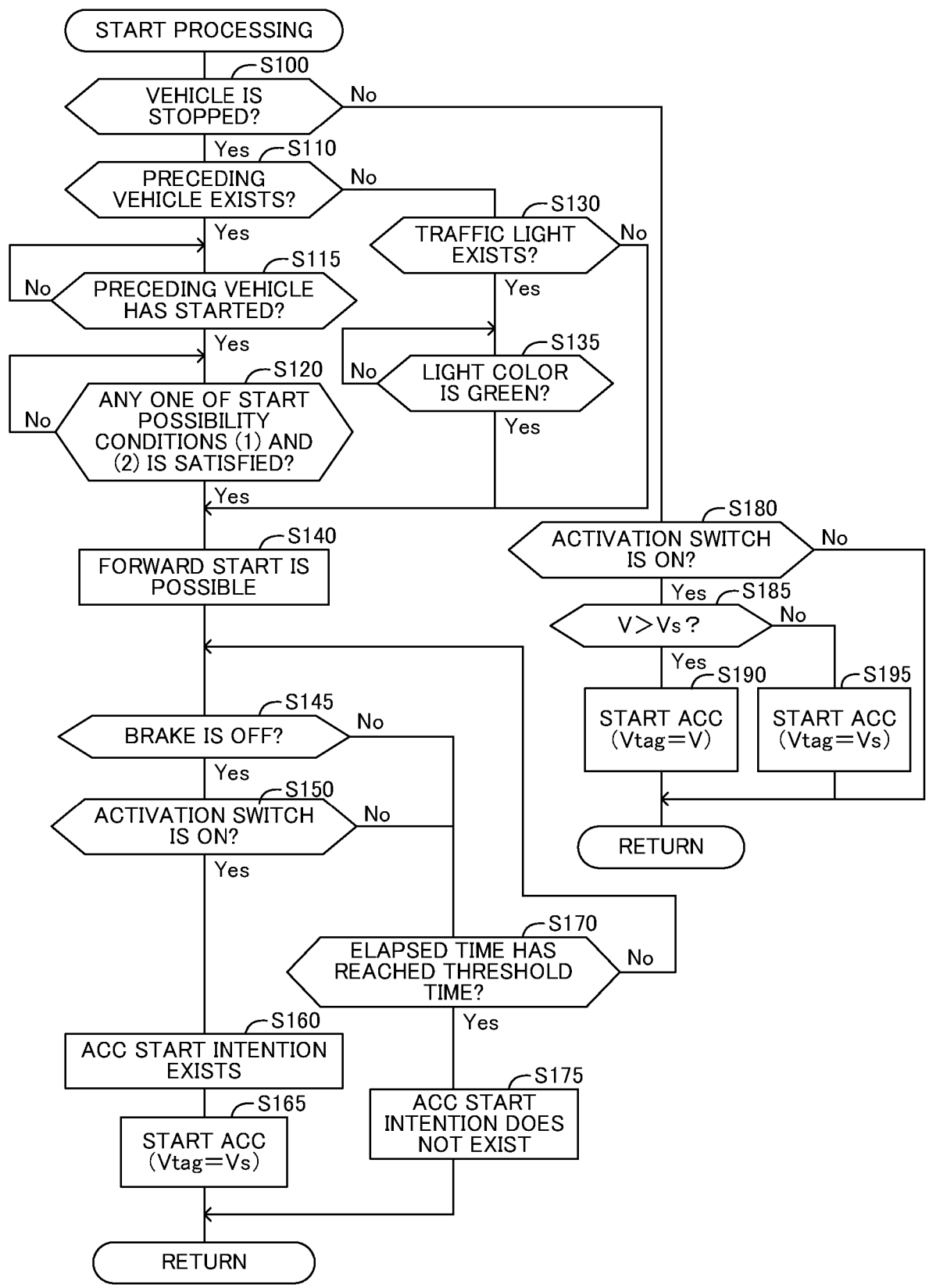
FIG. 3 is a flowchart for illustrating a routine of start processing for the ACC in the at least one embodiment.

Referring to a flowchart of FIG. 3, description is now given of a routine of the start processing for the ACC by the ECU 10. The routine of FIG. 3 is started under a state in which the ACC is stopped by default (the activation switch 61 is set to OFF) after the ignition switch or the power switch of the vehicle 100 is set to ON, or a state in which the driver has set the activation switch 61 to OFF (the above-mentioned stop condition (1) is satisfied).

In Step S100, the ECU 10 determines whether or not the vehicle 100 is stopped. It is only required to determine whether or not the vehicle 100 is stopped based on the detection result of the vehicle speed sensor 41. When the vehicle 100 is stopped (Yes), the ECU 10 advances the process to Step S110. Meanwhile, when the vehicle 100 is not stopped (No), that is, the vehicle 100 is traveling, the ECU 10 advances the process to Step S180.

In Step S180, the ECU 10 detects whether or not the activation switch 61 has been set to ON. When the activation switch 61 has been set to ON, the ECU 10 advances the process to Step S185. Meanwhile, when the activation switch 61 has not been set to ON (No), that is, when the activation switch 61 is set to OFF, the ECU 10 temporarily finishes (returns from) this routine.

In Step S185, the ECU 10 determines whether or not the current vehicle speed V of the vehicle 100 exceeds the lower limit vehicle speed Vs based on the detection result of the vehicle speed sensor 41. When the vehicle speed V exceeds the lower limit vehicle speed Vs (Yes), the ECU 10 advances the process to Step S190, and sets the target vehicle speed Vtag to the current vehicle speed V, to thereby start the ACC. Meanwhile, when the vehicle speed V does not exceed the lower limit vehicle speed Vs (No), the ECU 10 advances the process to Step S195, and sets the target vehicle speed Vtag to the lower limit vehicle speed Vs, to thereby start the ACC. After the ECU 10 starts the ACC in Step S190 or Step S195, the ECU 10 temporarily finishes (returns from) this routine.

When the determination in Step S100 is affirmative (Yes), that is, the vehicle 100 is stopped, the ECU 10 advances the process to Step S110, and determines whether or not a stopped preceding vehicle exists in front of the own vehicle 100 based on the detection result of the periphery recognition device 50. When a preceding vehicle exists (Yes), the ECU 10 advances the process to Step S115. Meanwhile, when a preceding vehicle does not exist (No), the ECU 10 advances the process to Step S130.

In Step S115, the ECU 10 determines whether or not the preceding vehicle has started forward. When the preceding vehicle has started forward (Yes), the ECU 10 advances the process to Step S120. Meanwhile, when the preceding vehicle has not started (No), that is, the preceding vehicle is stopped, the ECU 10 repeats the determination in Step S115.

In Step S120, the ECU 10 determines whether or not any one of the start possibility condition (1) that the relative distance Dr of the preceding vehicle with respect to the own vehicle 100 is equal to or longer than the predetermined threshold distance Dth and the start possibility condition (2) that the relative speed Vr of the preceding vehicle with respect to the own vehicle 100 is equal to or higher than the predetermined threshold speed Vth is satisfied. When any one of the start possibility condition (1) and the start possibility condition (2) is satisfied, the ECU 10 advances the process to Step S140. Meanwhile, none of the start possibility condition (1) and the start possibility condition (2) is satisfied, the ECU 10 repeats the determination in Step S120.

When the determination in Step S110 is negative (No), that is, when a stopped preceding vehicle does not exist in front of the own vehicle 100, it is assumed that the own vehicle 100 is stopped on a red traffic light in an intersection at the head of a line of vehicles. In this case, the ECU 10 advances the process to Step S130, and determines whether or not a traffic light exists in front of the own vehicle 100 based on the detection result of the camera sensor 52. When a traffic light exists (Yes), the ECU 10 advances the process to Step S135. Meanwhile, when a traffic light does not exist, the ECU 10 advances the process to Step S140.

In Step S135, the ECU 10 determines whether or not the light color of the traffic light is green based on the image data captured by the camera sensor 52. When the light color of the traffic light is green (Yes), the ECU 10 advances the process to Step S140. Meanwhile, when the light color of the traffic light is not green (No), that is, when the light color of the traffic light is red, the ECU 10 repeats the determination in Step S135. When the determination of the light color of the traffic light is entrusted to the visual observation of the driver, the ECU 10 is only required to skip the processing steps of Step S130 and Step S135, and advance the process to Step S140.

In Step S140, the ECU 10 determines that the own vehicle 100 is in the forward start possible state. After that, in Step S145, the ECU 10 determines whether or not the driver has executed the first start operation of releasing the brake pedal. When the driver has executed the first start operation (Yes), the ECU 10 advances the process to Step S150. Meanwhile, when the driver has not executed the first start operation (No), that is, the vehicle 100 is maintaining the stop state, the ECU 10 advances the process to Step S170.

In Step S150, the ECU 10 determines whether or not the driver has executed the second start operation of setting the activation switch 61 to ON. When the driver has executed the second start operation (Yes), the ECU 10 advances the process to Step S160. Meanwhile, when the driver has not executed the second start operation (No), the ECU 10 advances the process to Step S170.

In Step S170, the ECU 10 determines whether or not an elapsed time since the own vehicle 100 came to be capable of starting forward has reached a predetermined threshold time. When the elapsed time has not reached the predetermined threshold time (No), the ECU 10 returns the process to Step S145. Meanwhile, when the elapsed time has reached the predetermined threshold time (Yes), the ECU 10 advances the process to Step S175, and determines that the driver does not have the ACC start intention. Thus, the ECU 10 temporarily finishes (returns from) this routine without starting the ACC.

When the determination in Step S150 is affirmative (Yes), that is, the driver has executed the second start operation, the ECU 10 advances the process to Step S160, and determines that the driver has the ACC start intention. After that, in Step S165, the ECU 10 sets the target speed Vtag to the lower limit vehicle speed Vs, to thereby start the ACC. When the ECU 10 starts the ACC, the ECU 10 temporarily finishes (returns from) this routine.

Figure 4:
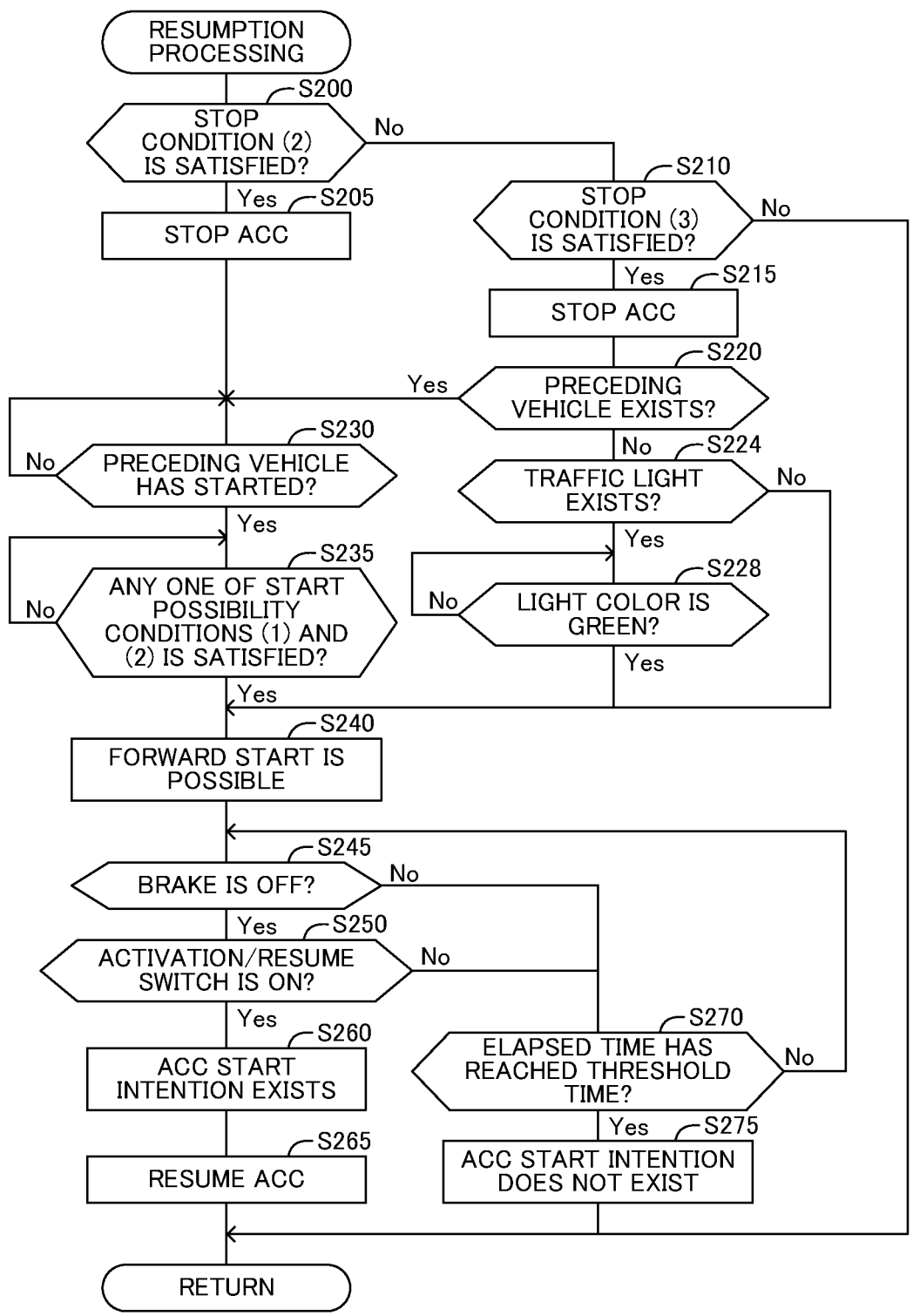
FIG. 4 is a flowchart for illustrating a routine of the resumption processing for the ACC in the at least one embodiment.

Referring to a flowchart of FIG. 4, description is now given of a routine of the resumption processing for the ACC by the ECU 10. This routine is started when the ACC is executed while following the flow of FIG. 3.

In Step S200, the ECU 10 determines whether or not the stop condition (2) is satisfied, that is, whether or not the own vehicle 100 has stopped due to stop of a preceding vehicle during the execution of the follow-up travel control. When the stop condition (2) is satisfied (Yes), the ECU 10 advances the process to Step S205, and switches the activation switch 61 from ON to OFF, to thereby stop, that is, disable the ACC. When the ECU 10 stops the ACC in Step S205, the ECU 10 advances the process to Step S230.

When the determination in Step S200 is negative (No), that is, the stop condition (2) is not satisfied, the ECU 10 advances the process to Step S210.

In Step S210, the ECU 10 determines whether or not the stop condition (3) is satisfied, that is, whether or not the vehicle 100 has stopped without the resumption of the ACC after the ACC was temporarily canceled. When the stop condition (3) is satisfied (Yes), the ECU 10 advances the process to Step S215, and switches the activation switch 61 from ON to OFF, to thereby stop, that is, disable the ACC. When the ECU 10 stops the ACC in Step S215, the ECU 10 advances the process to Step S220. Meanwhile, when the stop condition (3) is not satisfied in the determination in Step S210 (No), the ECU 10 temporarily finishes (returns from) this routine.

When the determination in Step S210 is affirmative (Yes), that is, the stop condition (3) is satisfied, there is assumed a case in which a preceding vehicle exists in front of the own vehicle 100 or a case in which a preceding vehicle does not exist. Thus, in Step S220, the ECU 10 determines whether or not a stopped preceding vehicle exists in front of the own vehicle 100 based on the detection result of the periphery recognition device 50. When a preceding vehicle exists (Yes), the ECU 10 advances the process to Step S230. Meanwhile, when a preceding vehicle does not exist (No), the ECU 10 advances the process to Step S224.

In Step S230, the ECU 10 determines whether or not the preceding vehicle has started forward. When the preceding vehicle has started forward (Yes), the ECU 10 advances the process to Step S235. Meanwhile, when the preceding vehicle has not started (No), that is, the preceding vehicle is stopped, the ECU 10 repeats the determination in Step S230.

In Step S235, the ECU 10 determines whether or not any one of the start possibility condition (1) that the relative distance Dr of the preceding vehicle with respect to the own vehicle 100 is equal to or longer than the predetermined threshold distance Dth and the start possibility condition (2) that the relative speed Vr of the preceding vehicle with respect to the own vehicle 100 is equal to or higher than the predetermined threshold speed Vth is satisfied. When any one of the start possibility condition (1) and the start possibility condition (2) is satisfied, the ECU 10 advances the process to Step S240. Meanwhile, none of the start possibility condition (1) and the start possibility condition (2) is satisfied, the ECU 10 repeats the determination in Step S235.

When the determination in Step S220 is negative (No), that is, when a stopped preceding vehicle does not exist in front of the own vehicle 100, it is assumed that the own vehicle 100 is stopped on a red traffic light in an intersection at the head of a line of vehicles. In this case, the ECU 10 advances the process to Step S224, and determines whether or not a traffic light exists in front of the own vehicle 100 based on the detection result of the camera sensor 52. When a traffic light exists (Yes), the ECU 10 advances the process to Step S228. Meanwhile, when a traffic light does not exist, the ECU 10 advances the process to Step S240.

In Step S228, the ECU 10 determines whether or not the light color of the traffic light is green based on the image data captured by the camera sensor 52. When the light color of the traffic light is green (Yes), the ECU 10 advances the process to Step S240. Meanwhile, when the light color of the traffic light is not green (No), that is, when the light color of the traffic light is red, the ECU 10 repeats the determination in Step S228. When the determination of the light color of the traffic light is entrusted to the visual observation of the driver, the ECU 10 is only required to skip the processing steps of Step S224 and Step S228, and advance the process to Step S240.

In Step S240, the ECU 10 determines that the own vehicle 100 is in the forward start possible state. After that, in Step S245, the ECU 10 determines whether or not the driver has executed the first start operation of releasing the brake pedal. When the driver has executed the first start operation (Yes), the ECU 10 advances the process to Step S250. Meanwhile, when the driver has not executed the first start operation (No), that is, the vehicle 100 is maintaining the stop state, the ECU 10 advances the process to Step S270.

In Step S250, the ECU 10 determines whether or not the driver has executed the second start operation of setting the activation switch 61 to ON or the driver has executed the third start operation of setting the resume switch 64 to ON. When the driver has executed any one of the second start operation and the third start operation (Yes), the ECU 10 advances the process to Step S260. Meanwhile, when the driver has executed none of the second start operation and the third start operation (No), the ECU 10 advances the process to Step S270.

In Step S270, the ECU 10 determines whether or not an elapsed time since the own vehicle 100 came to be capable of starting forward has reached a predetermined threshold time. When the elapsed time has not reached the predetermined threshold time (No), the ECU 10 returns the process to Step S245. Meanwhile, when the elapsed time has reached the predetermined threshold time (Yes), the ECU 10 advances the process to Step S275, and determines that the driver does not have the ACC start intention. Thus, the ECU 10 temporarily finishes (returns from) this routine without resuming the ACC.

When the determination in Step S250 is affirmative (Yes), that is, the driver has executed the second start operation or the third start operation, the ECU 10 advances the process to Step S260, and determines that the driver has the ACC start intention. After that, in Step S265, the ECU 10 resumes the ACC. When the driver has executed the second start operation, that is, the driver has set the activation switch 61 to ON, the ECU 10 sets the target speed Vtag to the lower limit vehicle speed Vs, to thereby resume the ACC. Meanwhile, when the driver has executed the third start operation, that is, the driver has set the resume switch 64 to ON, the ECU 10 resumes the ACC based on the target vehicle speed Vtag temporarily stored in the RAM of the ECU 10 when the ACC was canceled. When the ECU 10 resumes the ACC, the ECU 10 temporarily finishes (returns from) this routine.

According to the at least one embodiment described in detail above, when the driver is to start the stopped vehicle 100 through use of the ACC, the ACC can early be started only by (1) releasing the brake pedal, and (2) setting the activation switch 61 to ON under the state in which the vehicle 100 can start forward. Moreover, the ACC can early be resumed only by (1) releasing the brake pedal, and (2)

setting the activation switch 61 or the resume switch 64 to ON under the state in which the vehicle 100 can start forward. That is, it is not required to perform the accelerator operation required to start or resume the ACC in the related-art EPB-non-installed vehicle, specifically, the operation of depressing the accelerator pedal to increase the vehicle speed V to the lower limit vehicle speed Vs. As a result, it is possible to effectively prevent the driver from being annoyed, and the convenience of the operation can reliably be increased.

In the above, the driving assistance device, the driving assistance method, and the program according to the at least one embodiment have been described, but the present disclosure is not limited to the above-mentioned at least one embodiment, and various modifications are possible within the range not departing from the object of the present disclosure.

Modification Example

Figure 5:
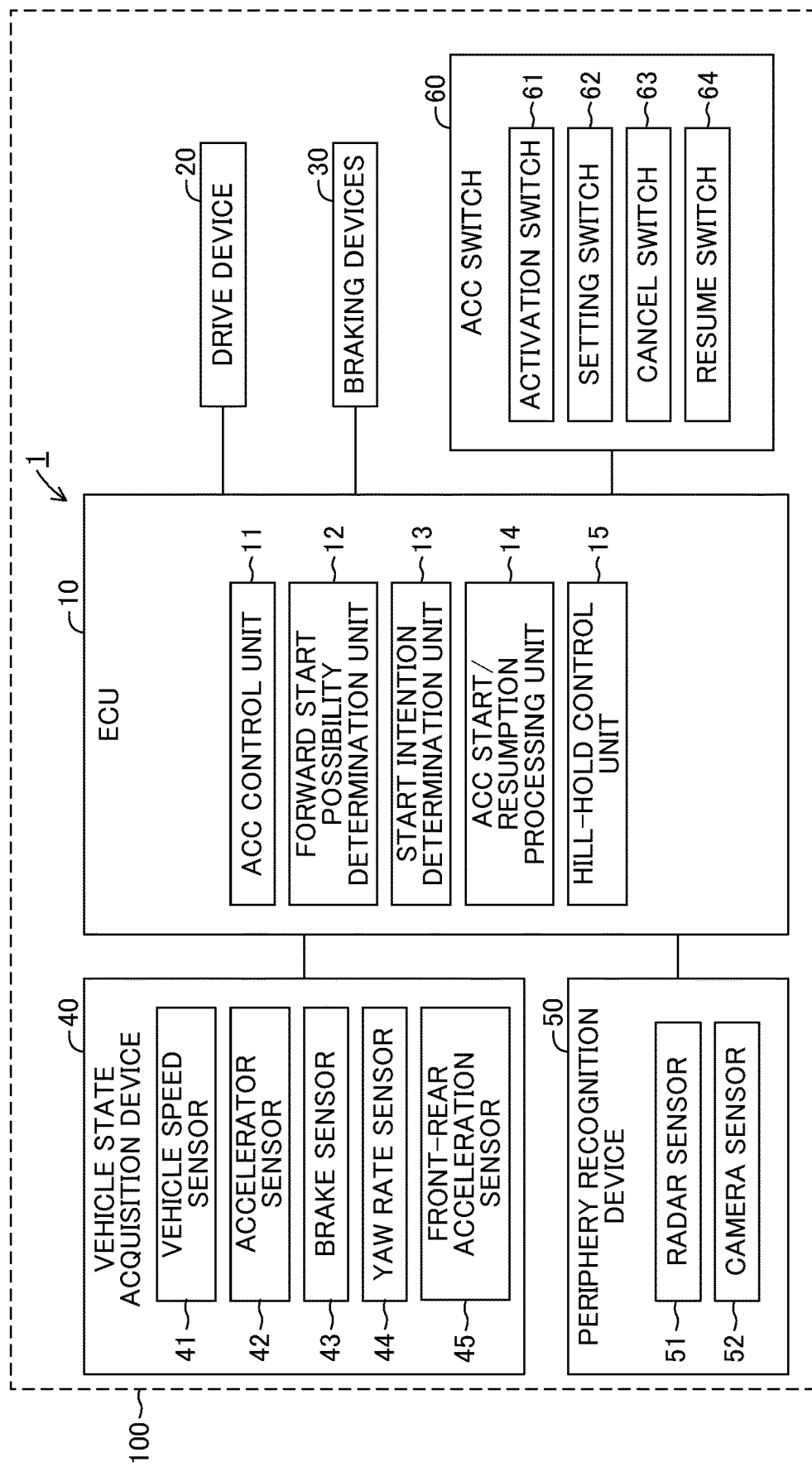
FIG. 5 is a schematic overall configuration diagram of a driving assistance device according to a modification example of the present disclosure.

FIG. 5 is a schematic overall configuration diagram of the driving assistance device 1 according to a modification example of the present disclosure. In the modification example, the ECU 10 includes a hill-hold control unit 15 as a functional element. The hill-hold control unit 15 executes so-called hill-hold control of preventing a downhill movement of the own vehicle 100 when the own vehicle 100 stops on an uphill road by applying the braking force to the wheels of the own vehicle 100 independently of the brake operation of the driver and holding the braking force.

The hill-hold control unit 15 estimates an inclination gradient θ of the uphill road based on the acceleration G in the front-rear direction detected by the front-rear acceleration sensor 45 when the vehicle 100 has stopped. When the vehicle 100 includes a gradient sensor, the inclination gradient θ may directly be detected by this gradient sensor. The hill-hold control unit 15 starts the hill-hold control of activating the braking devices 30, to thereby apply the braking force to the wheels of the vehicle 100 when the inclination gradient θ is equal to or larger than a predetermined threshold gradient θth. The braking force may be a fixed value, or a variable value in accordance with the inclination gradient θ.

After the hill-hold control unit 15 starts the hill-hold control, the hill-hold control unit 15 releases the braking force when the driver depresses the accelerator pedal. Moreover, the hill-hold control unit 15 releases the braking force when, after the hill-hold control is started, the driver sets the activation switch 61 to ON in order to start the ACC, or the driver sets the activation switch 61 or the resume switch 64 to ON in order to resume the ACC.

Figure 6:
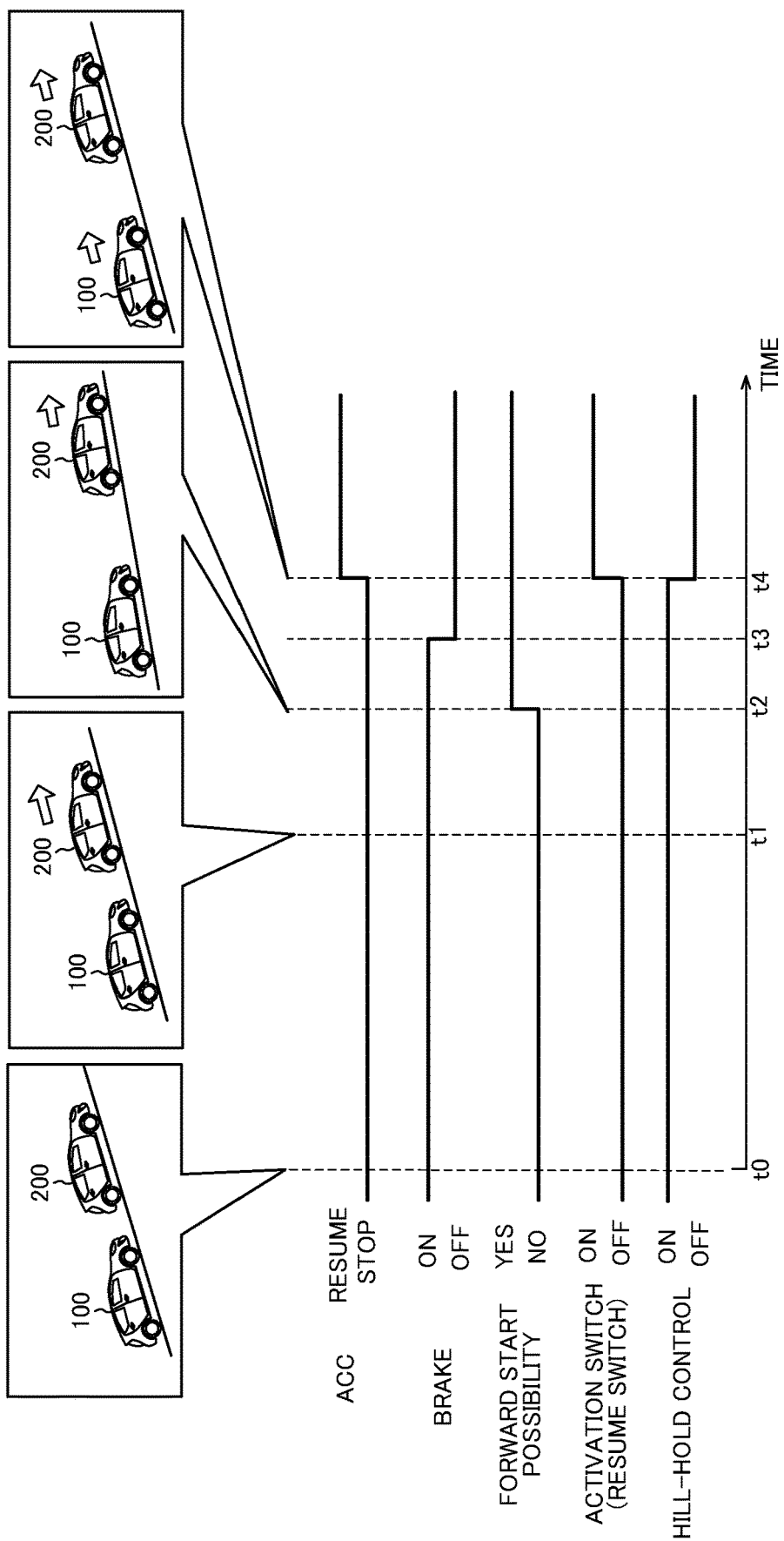
FIG. 6 is a timing chart for illustrating a flow of resumption processing for the ACC in the modification example.

Referring to a timing chart of FIG. 6, description is now given of a flow of the resumption processing for the ACC in the modification example. Only processing of determining the forward start possibility is different between the case in which the preceding vehicle 200 exists in front of the stopped own vehicle 100 and the case in which the preceding vehicle 200 does not exist, and the other processing is equivalent therebetween. Thus, the case in which the preceding vehicle 200 exists is described below. Moreover, the start processing for the ACC and the resumption processing for the ACC are different from each other only in that the ON setting of the resume switch 64 is effective or ineffective. Thus, the resumption processing for the ACC is described below.

At the time t0, there exists a state in which the hill-hold control is being executed because the ACC is stopped due to the satisfaction of the above-mentioned stop condition (2) or stop condition (3) and the own vehicle 100 is stopped on an uphill road. When the preceding vehicle 200 starts at the time t1, the ECU 10 starts the determination processing for the forward start possibility. When, at the time t2, any one of the start possibility condition (1) that the relative distance Dr of the preceding vehicle 200 with respect to the own vehicle 100 is equal to or longer than the predetermined threshold distance Dth and the start possibility condition (2) that the relative speed Vr of the preceding vehicle 200 with respect to the own vehicle 100 is equal to or higher than the predetermined threshold speed Vth is satisfied, the ECU 10 determines that the own vehicle 100 is in the forward start possible state.

When the driver releases the brake pedal at the time t3, and the driver sets the activation switch 61 (or the resume switch 64) to ON at the time t4, the ECU 10 releases the braking force applied by the hill-hold control, and resumes the ACC. That is, even when the driver releases the brake pedal at the time t3, the braking force applied by the hill-hold control is being applied until the driver sets the activation switch 61 (or the resume switch 64) to ON at the time t4. As a result, when the vehicle 100 starts from the state in which the vehicle 100 is stopped on an uphill road, even when the driver releases the brake pedal, the ACC can smoothly be resumed without occurrence of the downhill movement of the vehicle 100, and hence the drivability can be increased.

[Others]

In the above-mentioned at least one embodiment, the ECU 10 may further have a function of executing automatic stop control of activating the braking devices 30 when a traffic light having the light color in red is detected in front of the traveling vehicle 100, to thereby stop the own vehicle 100 before the traffic light. In this case, as the stop conditions for the ACC, in addition to the above-mentioned stop condition (1) to stop condition (3), it is only required to add the following stop condition.

Stop condition (4): The own vehicle 100 has stopped before a traffic light through the automatic stop control during the execution of the ACC.

Even when the vehicle 100 has stopped due to the satisfaction of the stop condition (4), as in the above-mentioned at least one embodiment, the ACC is started or resumed when the driver releases the brake pedal and sets the activation switch 61 (or the resume switch 64) to ON under the state in which the vehicle 100 can start forward, thereby being capable of effectively increasing the convenience.

What is claimed is:

1. A driving assistance device for a vehicle, comprising:
an electronic control unit (ECU) configured to execute, based on a situation of a periphery of an own vehicle, travel control of at least one of constant-speed travel control of causing the own vehicle to travel at a constant speed or follow-up travel control of causing the own vehicle to travel to follow a preceding vehicle, and to disable the travel control during stop of the own vehicle when the own vehicle is stopped by operation of a brake pedal by an occupant of the own vehicle;
a brake pedal detector configured to detect release of the brake pedal by an occupant of the own vehicle; and
an interface configured to receive an assistance request from the occupant,
wherein the electronic control unit is configured to execute resumption of the travel control when the brake pedal detector detects the release of the brake pedal and the interface receives the assistance request during the stop of the own vehicle upon disabling the travel control by operation of the brake pedal.

2. The driving assistance device according to claim 1, wherein the electronic control unit is configured to determine whether the own vehicle is in a start possible state in which the own vehicle is allowed to start forward, based on the situation of the periphery of the own vehicle during the stop of the own vehicle, and wherein the electronic control unit is configured to enable execution of one of start or resumption of the travel control when the brake pedal detector detects the release of the brake pedal and the interface receives the assistance request after the electronic control unit determines that the own vehicle is in the start possible state during the stop of the own vehicle.

3. The driving assistance device according to claim 2, wherein the electronic control unit is configured to:

execute braking force holding control of holding a braking force for maintaining the own vehicle in a stop state when the own vehicle has stopped on an uphill road; and hold the braking force even when the brake pedal detector detects the release of the brake pedal during the execution of the braking force holding control, and release the braking force and enable the travel control when the interface receives the assistance request.

4. The driving assistance device according to claim 2, wherein the electronic control unit is further configured to:

recognize a light color of a traffic light based on a detection result of a sensor when the own vehicle is stopping at the traffic light; and determine whether the own vehicle is in the start possible state in which the own vehicle is allowed to start forward, based on the recognition result of the light color of the traffic light.

5. The driving assistance device according to claim 4, wherein the sensor is at least one of a radar sensor and a camera sensor.

6. The driving assistance device according to claim 2, wherein the electronic control unit is configured to:

enable the travel control, when the brake pedal detector detects the release of the brake pedal and the interface receives the assistance request during the stop of the own vehicle before an elapsed time reaches the predetermined threshold time, the elapsed time being from the time when it is determined that the own vehicle is in the start possible state.

7. The driving assistance device according to claim 1, wherein the electronic control unit is configured to:

execute braking force holding control of holding a braking force for maintaining the own vehicle in a stop state when the own vehicle has stopped on an uphill road; and hold the braking force even when the brake pedal detector detects the release of the brake pedal during the execution of the braking force holding control, and release the braking force and enable the travel control when the interface receives the assistance request.

8. The driving assistance device according to claim 1, wherein the own vehicle is an EPB-non-installed vehicle in which an electric parking brake is not installed.

9. A driving assistance method for a vehicle, comprising:

executing, based on a situation of a periphery of an own vehicle, travel control of at least one of constant-speed travel control of causing the own vehicle to travel at a constant speed or follow-up travel control of causing the own vehicle to travel to follow a preceding vehicle, and disable stopping the travel control during stop of the own vehicle when the own vehicle is stopped by operation of a brake pedal by an occupant of the own vehicle; and executing resumption of the travel control when release of a brake pedal by an occupant of the own vehicle is detected and an assistance request from the occupant is received during the stop of the own vehicle upon disabling the travel control by operation of the brake pedal.

10. A non-transitory computer readable medium containing a program containing executable instructions for causing a computer of a driving assistance device for a vehicle to execute the processes of:

executing, based on a situation of a periphery of an own vehicle, travel control of at least one of constant-speed travel control of causing the own vehicle to travel at a constant speed or follow-up travel control of causing the own vehicle to travel to follow a preceding vehicle, and disabling the travel control during stop of the own vehicle when the own vehicle is stopped by operation of a brake pedal by an occupant of the own vehicle; and executing resumption of the travel control when release of a brake pedal by an occupant of the own vehicle is detected and an assistance request from the occupant is received during the stop of the own vehicle upon disabling the travel control by operation of the brake pedal.

* * * * *